Nov. 16, 1937.   A. P. VAN HEEDEN   2,099,150
APPARATUS FOR PRODUCING GAS
Original Filed May 31, 1927    2 Sheets-Sheet 1
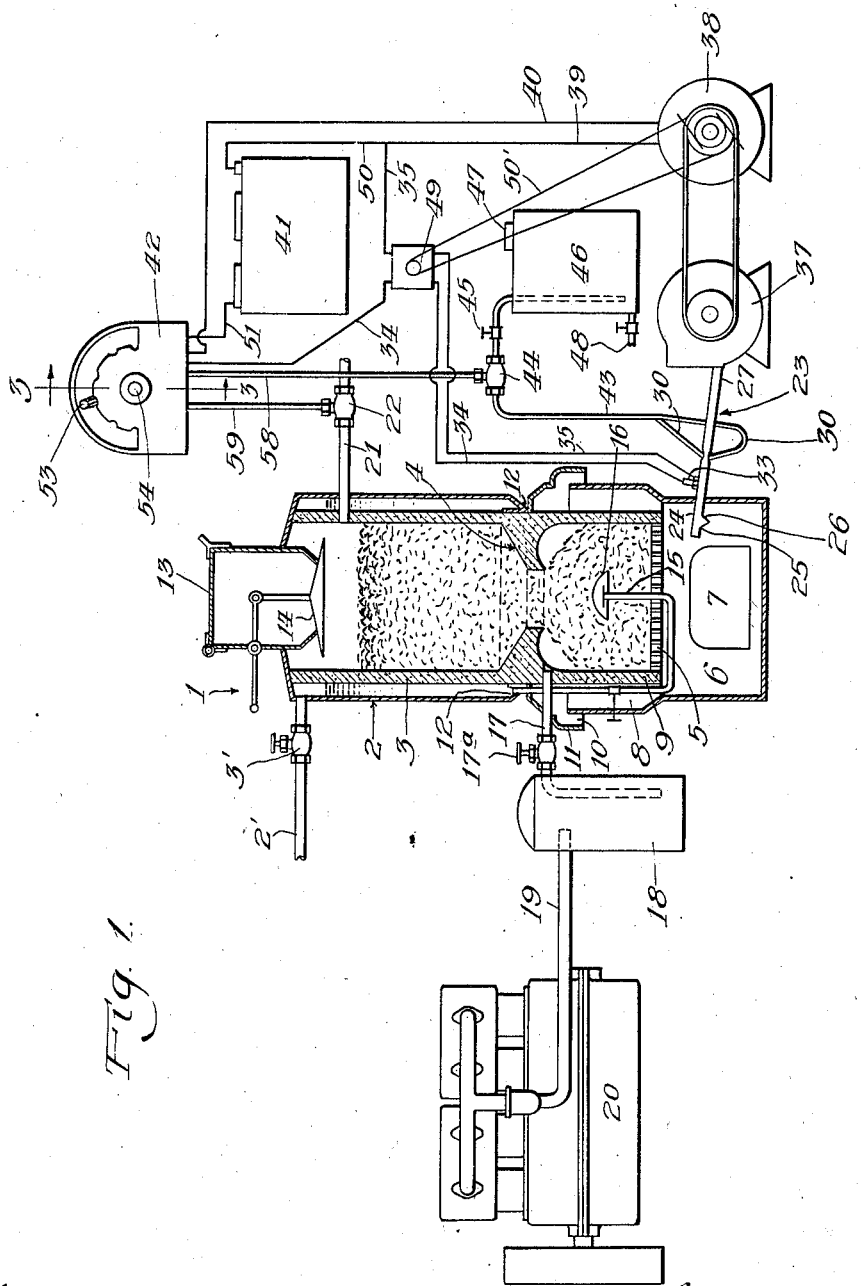

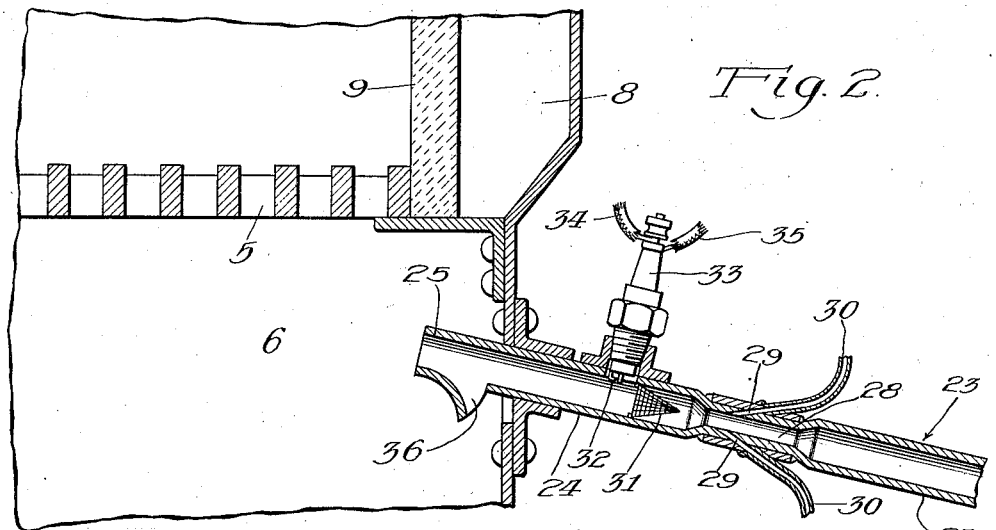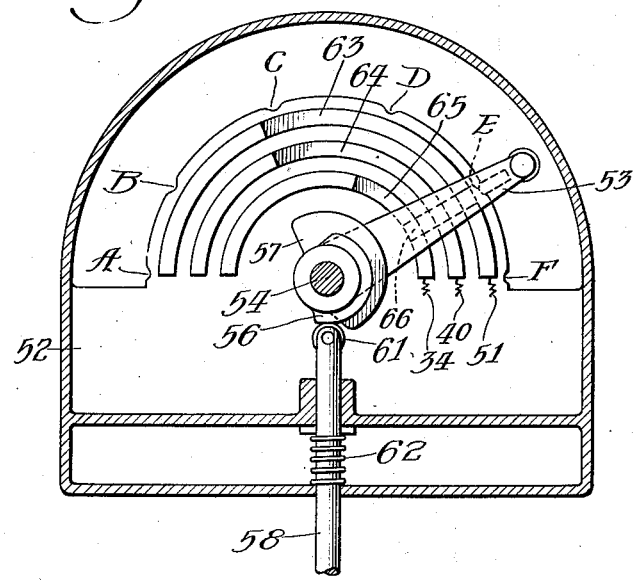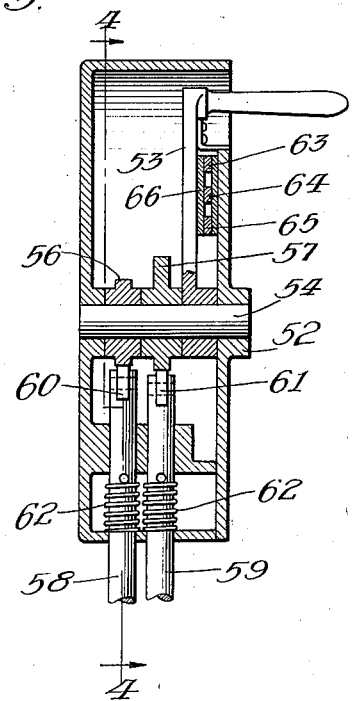

Patented Nov. 16, 1937

2,099,150

UNITED STATES PATENT OFFICE 2,099,150

APPARATUS FOR PRODUCING GAS

Arthur P. van Heeden, Chicago, Ill., assignor, by mesne assignments, to Universal Oil Products Company, Chicago, Ill., a corporation of Delaware Original application May 31, 1927, Serial No. 195,193, now Patent No. 1,900,141, dated March 7, 1933. Divided and this application January 6, 1932, Serial No. 585,045. Renewed February 13, 1937

4 Claims. (Cl. 48—87)

This application is a division of my copending application, Serial No. 195,193, filed May 31, 1927, now Patent 1,900,141, March 7, 1933.

My invention relates to an apparatus for producing gas from hydrocarbon-containing solid or semi-solid materials such as coal, coke, wood, charcoal and the like.

My invention relates more particularly to an apparatus for producing gas in gas-generators in such a manner that the gas producer can be brought to effective operating condition, within a time materially less than the time usually necessary. The apparatus object of my invention permits efficient use of gas produced from the hydrocarbon-containing materials heretofore listed in connection with power or heating installations where the power must be developed almost instantaneously, and my invention particularly permits the use of the gas produced to develop the power of automotive engines and for general heating purposes. It will permit the application of gas economically to new industrial uses such as heating, domestic and industrial uses, driving automotive and stationary engines, etc.

Means now employed for the ignition and starting of a gas generator are relatively inefficient and time-consuming and the lack of a suitable device by means of which this gas production can be started quickly and brought to full efficiency within a short time is one of the main reasons for not using this inexpensive supply of an efficient fuel in a more extensive manner.

Among the advantages of my invention are; to shorten the time necessary for producing gas in gas generators; to operate and control the production of gas in connection with and in proper timing with the operation of the device in which the gas is used; to provide for a controlled method and device whereby the gas generator, and the apparatus in which the gas produced is used, can be controlled in a simple manner; to provide for an apparatus whereby the power which can be recovered from the gas may be controlled in connection with the requirements of the apparatus in which it is used, whereby the working efficiency of the apparatus may be automatically controlled, and in a general manner to provide for an apparatus of the improved character hereafter described.

Other advantages of my invention will appear from the following description:

In the attached drawings, Fig. 1 is a diagrammatic and schematic view, partly in section and partly in elevation, of an apparatus which can be used to carry out my invention, which I have shown as applied to the production of gas for use in an engine.

Fig. 2 is an enlarged fragmentary vertical sectional view of the ignition device.

Fig. 3 is an enlarged sectional view of the switch taken on lines 3—3 of Fig. 1.

Fig. 4 is an enlarged fragmentary side elevational view of the switch.

The various connections and devices used, and which I have shown in the drawings and describe hereafter, are not to be taken as a limitation of the scope of my invention, and it is understood that other devices whereby the herein described method may be carried out are well within the scope of my invention. I describe hereafter and show in the drawings the application of the invention to the production of gas for use in engines, but as I have heretofore stated, the application of my invention to the production of gas for other uses, such as heating and industrial purposes, etc., is well within the scope of my invention.

Referring more in detail to the drawings, 1 designates a gas producer which may be of any desired construction and which may comprise preferably a cylindrical metallic wall 2, lined with refractory material 3, provided at a point intermediate its height with an internal circular projection 4, which is provided for limiting the hot partial combustion zone. A grate 5, may be positioned at the bottom of the cylinder 1, through which the air for draft is injected inside the producer and the gas producer is mounted above an ash pit 6, provided with cleaning door 7.

The lower portion of the cylindrical metal wall 2, preferably comprises a hollow jacket 8, surrounding the combustion zone and protected therefrom by heat radiating material, shown at 9. This jacket 8 may be provided at its upper portion with air inlet openings 10, distributed around the periphery of the jacket whereby air required for the combustion of the fuel in the gas producer may be preheated, before passing though the grate 5, by the heat of the partial combustion zone, through the radiating walls 9. The air inlet openings 10 of the air preheating jacket 8 may be provided with caps 11, to prevent irregularities in the draft. It is well understood that dampers may be provided in the air inlet flues or openings 10, so as to control the proportion of air admitted to the producer.

The metal wall 2 surrounding the upper portion of the gas producer and separated from the lower air preheating jacket 8 by means of partition 12, may also comprise a hollow jacket which is used for preheating the water to be used in vapor form for injection in the gas producer. Water may be introduced into the zone formed between the wall 2 and refractory wall 3 through pipe 2' controlled by valve 3'. By this arrangement freezing of water may be prevented when the device is used in open air as in automotive engines. At the same time, as the water is preheated, the upper portion of the gas producer is cooled, which provides for an easier handling of the fuel and apparatus. The gas producer is provided at its upper portion with feed bin 13, closed at its lower part by charger 14, which may or may not be automatically operated. Steam for gas production may be injected into the combustion zone through injecting pipe 15, which may be covered with a cap 16 for better diffusion of the steam through the combustion zone, and this cap 16, may be made of a catalyst such as nickel or the like, for accelerating the conversion of the steam into its chemical components.

The gas producer 1 may be provided with a gas-outlet pipe 17, which may be controlled by valve 17a, and which may be connected to any point of the gas producer, but preferably below the circular projection 4. This pipe may direct the gas to a gas cleaner, such as shown in a conventional manner at 18, from which the gases, after being cleaned, may be withdrawn through pipe 19 and directed to the cylinders of the engine shown diagrammatically at 20. The cleaner or purifier 18 may be of any desirable type, or it may be dispensed with entirely when the gases from pipe 17 pass directly to the engine.

The upper portion 21 of the gas producer may be provided with an exhaust pipe 21 controlled by valve 22, the purpose of which will be hereafter more fully explained.

At the lower portion of the gas producer below the grate 5, is positioned an ignition device designated as a whole 23, shown more in detail in Fig. 2. The ignition device 23 comprises an elongated tube 24, one end 25 of which is inserted inside the gas producer, and the other end of which is connected by means of pipe 27 with an air blower 37, as will hereafter be described. The tube 24 may be provided at an intermediate point in its length and outside the gas producer with a restricted portion 28, forming a suction nozzle.

The restricted portion 28, can be provided with ports as shown at 29, each port forming a small-sized conduit diagonally disposed in the wall of the tube 24. The inner opening of the ports in the inside of the tube 24 is preferably at the point of the restricted portion 28, so that the air passing through the ignition device from the pipe 27 to the end 25, inside the gas producer, will cause suction on the ports 29 through which fuel may be drawn in, as will hereafter be described. The ports 29, of which any number may be provided on the periphery of the tube 24, may be connected to the main supply of liquid fuel as will hereafter be described through pipes 30, each pipe 30 being a continuation of each port 29.

The air and liquid fuel mixed at the outlet of the restricted portion 28 are mixed and intimately combined by being passed through a screen 31 of fine mesh positioned a short distance in front of the air and liquid fuel mixing point. This screen may take any desired form but I have shown, as a preferred form, a conical screen, the base of which is attached or welded to the inside wall of the tube 24. The screen 31 also serves to prevent back firing when the gas is diverted from the receiver where it is used, as will be described later.

After passing through the screen, the intimately mixed fuel and air pass across spark 32, obtained by passing electrical current through spark plug 33, said current being furnished through wires 34 and 35. The fuel is thus ignited and the flame is forced through the end of the tube 24, inside the producer and below the grate 5.

The inner end 25 of the ignition tube 24 may be provided with a lip-like port 36, for admitting an additional supply of air, which permits a spread of the flame in a practically even distribution below the entire surface of the grate. The lip-like opening 36, may also serve as a means for discharging any solid particles which might enter the device during the operation.

The air tube 27, connected to the ignition device as above described, may be connected at its other end with an air blower 37, which may be of any desired type, and which is actuated through gear, or belt and pulley connection by electric motor, 38 which is preferably of the variable speed type. The motor receives the current required for its operation through wires 39 and 40.

The circuit through which the current is furnished to the ignition device 23, through wires 34 and 35 and to the motor 38, through the wires 39 and 40, comprises a source of electrical current which may be of any type, such as storage battery or dry cell battery, etc., and which has been diagrammatically shown in the drawings at 41, and each of these circuits is provided with switch or interrupting means to open or close the circuit.

As one of the features of my invention, I have shown and described hereafter, a preferred form of switch, represented in Fig. 1, at 42, and shown in detail in Figs. 3 and 4. This is an interrupting switch as well as a timing switch, whereby the succeeding steps required to operate the gas generator can be set in operation in the desired succession and order, and also with the proper timing in relation with each other to produce the results desired.

Referring back to the ignition device 23, the liquid fuel injecting pipes 30 may be connected to a manifold 43, on which is interposed a liquid fuel supply control valve 44, and a flow regulating valve 45, which is preferably hand controlled and the manifold 43 is connected to a liquid fuel storage tank shown at 46, provided with suitable filling means 47, and drains 48.

The control of the spark 33, is preferably provided for by means of a timer or buzzer diagrammatically shown at 49 and interposed in the circuit of the spark on wires 34 and 35. I have illustrated a timer type where the timing of the spark is controlled by means of the rotating motor 38. The timer may be mounted direct on the shaft of the motor 38, or it may be actuated through a belt connection 50', as shown. If the buzzer type with induction coil is used, the spark timer is simply interposed on the electrical circuit of the lines 34 and 35 without connections to the motor.

As a further feature of my invention, the control of the valve 22 on the upper exhaust pipe 21, the control of the liquid fuel supply control valve 44, and the control of the ignition device through air blower and spark are automatically timed in relation to each other by combining the control of each of these steps or parts, at a single main switch 42, above referred to, whereby simplicity and safety in the operation of the device are obtained.

In this switch are thus combined the mechanical and electrical control, to-wit: mechanical control for the opening and closing of the valves 22 and 44 and the electrical control of the currents going to the motor 38, for air blowing into the ignition device, and to the spark of said ignition device.

The conductor 34, part of the spark plug circuit and the conductor 40, part of the motor circuit, are connected independently to two points of the switch 42, as will hereafter be described. The conductors 35 and 39 which are part of the spark plug and motor circuits as heretofore mentioned may be connected in parallel to one of the poles of the battery or other electrical source 41, through conductor 50, and the pole of the electrical source 41 is connected to another point of the switch 42, through conductor 51.

The switch 42, which may be of any desirable type, and which I have shown as of the disc and lever type, may comprise a semi-circular disc 52, at the center of which is provided movable lever 53. The lever 53 is fixedly attached to the shaft 54 which passes through the center of the switch disc 52, and is rotatable therein. The shaft 54 may have a projection on which may be positioned and fixedly attached two cams 56 and 57. In the design described here the cam 56 is of smaller diameter than the cam 57, and is positioned in relation with the cam 57 in such a manner that, at one end of the course of the lever, cam 56 will begin to work before cam 57, and vice versa at the other end of the course of the lever. In the design herein described, the end of the course of the lever at which cam 57 acts before cam 56 corresponds to the dead point and to the shutting off of the ignition device or starter, while the gas generator is itself shut off or working, and the other end of the course of the lever over the switch 52 corresponds to the full operation of the ignition device and to the opening of the exhaust valve 22, in order to permit the starting of the gas producer and the exhausting of the air present in the gas producer. In the meantime, and while going from the dead end of the operating end of its course, the lever actuates successively and in the order hereafter described, the various steps and mechanics of the ignition and starting device.

On the periphery of the disc 52 of the switch are marked six points which may be indicated by a notch and shown in the drawings at A, B, C, D, E and F. For convenience in the understanding of the operation, the notch A corresponds to the nonoperative position of the ignition device and the notch F corresponds to the full operative position of the ignition device.

Below each cam is positioned a shaft respectively designated at 58 and 59, the top of which may be provided with small rollers 60 and 61. Each shaft is positioned relative to the corresponding cam, so that when the cam comes in contact with the roller, it forces the shaft down. The shaft 58 actuated by cam 56, is connected at its other end with the valve 44, controlling the admission of the liquid fuel to the ignition device 23, while the shaft 59 actuated by cam 57, is connected at its other end with the valve 22, controlling the exhaust pipe 21, the downward motion of the shafts 58 and 59 opens the valves and the upward motion closes them; the upward motion of each shaft is obtained when the cam releases the downward pressure on the shaft by means of a coil spring 62 attached in any desirable manner to the shaft and to a fixed point.

The face of the disc 52 of the switch over which the lever travels may be provided with three concentric circular electrical contacts respectively designated at 63, 64 and 65. Each contact respectively occupies only a portion of the length of the arc described on the semi-circle by the lever 53, and further, each contact may be connected with one of the electrical conductors 34, 40 and 51, heretofore described. More particularly in the design shown, the contact 63 is connected to the battery 41 through conductor 51, or to other sources of current. The contact 64 is connected through the conductor 40 to the motor 38, and the contact 65 through the wire 34 is connected to the spark plug circuit. A contact brush or bar 66, is provided and properly insulated in the lever 53, in such a position that it may come in contact with the three contacts, 63, 64 and 65 simultaneously.

The three contacts are suitably insulated from each other, and from the surrounding metal parts. It is thus apparent that, through the brush 66, the battery circuit 51 can pass from contact 63 to the motor circuit and to the spark plug circuit through contacts 64 and 65, which may be in contact with the brush 66 at the same time.

It is to be noted that the motor contact 64 and the battery contact 63, cover the same arc on the switch and go from the notch C to the notch F above described, while the spark contact 65 covers a shorter arc and goes from the notch D to the notch F. Thus, when the lever is between the notches C and D the current only goes to the motor circuit and the motor 38 and blower 37 operate. When the lever 53 is between the notches D and F, the current goes to both contacts 64 and 65, thus, the current goes to both the motor circuit and spark circuit, and the motor blower and spark all work.

The cam 56 has been shown as of a smaller diameter than the cam 57 for the reason that the cam 56 is connected to the liquid fuel control valve 44 while the cam 57 is connected to the control valve 22 on the producer gas outlet pipe or vent 21. Since gas outlet valve 22 is preferably larger than liquid fuel control valve 44, a larger displacement is needed for the operation of the former than for the latter.

The operation of the switch 42 is as follows: When the lever 53 is in engagement with the notch A, one of the ends of the cam 57 is in contact with it and forces down the shaft 59, thus causing the valve 22, on the producer gas outlet pipe or vent 21, to be opened. All other connections from the switch are cut off or closed. This permits, as will be hereafter more fully explained, formation of gas in the gas producer and operation of the latter while the engine or utilizing means for the gas is at rest.

When the lever 53 is in engagement with the notch B there is no contact between the three electrical circuits, the cams are inoperative and this corresponds to the dead point. At this point either the gas producer has not been started at all, and no gas is produced, or a normal production of gas takes place in the gas producer in operation after the starting device has been used, and the gas goes to the engine or other device for utilization.

When the lever 53 is in engagement with notch C, there is contact between the battery and the motor and blower circuits, which causes operation of the blower and a forced draft of air is established through the ignition device 23, into the gas producer below the grate 5.

When the lever 53 is in engagement with the notch D, contact is established through the motor-blower and through the spark circuits. No other action is taking place at that time except the injection of air through blower 37 and the production of the spark at 3' These two contacts continue when the lever moves from the notch D to the notch E, and when the lever is in engagement with notch E, the small cam 56 has come in contact with the shaft 59 and has forced the latter down completely, causing the opening of the liquid fuel supply control valve 44 from tank 46 to ignition device 23.

It is to be noted that hand control valve 45 is continuously open, but the size of the opening of said valve 45 is hand controlled independently, thus controlling the amount of liquid fuel which is allowed to pass out from tank 46. Thus, when the lever is at point E of the switch, and the spark and blower are operating, suction of liquid fuel is allowed to take place by the opening of the valve 44 from the tank into the ignition device through ports 29, lines 30, and manifold 43. This causes ignition of the liquid fuel in the ignition device.

When the lever moves from the notch E to the notch F on the switch the same contacts are established both electrically and mechanically, so that the ignition device continues to operate in the same manner and when the lever comes into engagement with F, the larger diameter cam 57, has come in contact with the shaft 58 and has forced it down, causing the opening of the gas outlet valve 22 on the exhaust pipe 21, which permits the gases caused by the operation of the ignition device during the starting period to be evacuated until full production is obtained.

As an important feature, the air present in the gas producer if the latter was not in operation, is permitted to escape through the opening of the valve 22, practically at the time when the ignition device is started, by moving the lever 53, from the notch E to the notch F, and the combustion gases first formed at the start force this air out through the exhaust pipe 21.

This method and device permit a complete control of the gas producer from nonoperating position or from such operation, as consists in slow production of gas without utilization of said gas in an engine or otherwise, to full operating position.

It is possible to start and bring the gas producer to full production in an extremely short time; or to stop the utilization of the gas for heat or power for any length of time, minimizing the fuel consumed and the time required to bring the engine back to operation by keeping the gas producer on a slow production during that time. It is also possible, when the gas is not used, but where the gas producer is left in operation, to decrease the production of gas by regulating the suction of air through the gas producer to a glowing point or to any degree desired.

As another feature of my invention, while I have provided for a normal air draft, i. e., a self-generating method for producing gas, through the air ports 10, in Fig. 1, it may also be possible to force the production of gas in the generator to a large increased peak or overload by operating the blower in connection with the normal draft.

It can thus be seen that the method and apparatus of my invention may be utilized for a great many applications, including stationary engines, automotive engines, propelling of automobiles, boats, locomotives, for industrial and domestic heating purposes and for any purpose wherein gas can be used for power or heating means.

I will describe hereafter, as an illustration, the operation of the gas producer in connection with an engine. Taking first the gas producer and engine in a nonworking position, the gas producer is first charged with fuel such as coal or other carbonaceous material through hopper 13. The air ports 10 are open, but valve 17a on the gas main from the gas producer to the engine is closed. The valve 45 on the liquid fuel suction line to the ignition device is opened. The lever of the switch 42 is brought from the point B to the point C which, as heretofore explained, starts the blower 47 and forces air under the grate 5. Immediately afterward, the lever is brought to the point D which starts the spark in the ignition device without cutting out the blower, and immediately the lever is switched to the point E where fuel is sucked into the ignition device as heretofore described, ignition of fuel taking place, and causing start of the blast in the gas producer.

Immediately afterwards, the lever 53 is switched to the point F, which opens the gas outlet valve 22 in the pipe 21, permitting the air present in the gas producer to be forced out through the gas outlet pipe by means of the production of gas taking place at the bottom of the gas producer. The natural and forced drafts thus produced, permit instantaneous combustion of the fuel in the gas producer and almost instantaneous production of gas to the full capacity of the producer.

According to the character and quality of the fuel used in the gas producer, the time necessary to secure full production of gas from the moment the blower is started, may vary, but with a normal fuel, and in normal conditions of operation, 20 to 30 seconds, more or less, may be sufficient to bring production of gas to its full degree. A small gas sampler may be provided on the exhaust pipe 21, whereby the characteristics of the gas can be determined. When the hot gas shows at the sampler, which is a sign of full efficiency being reached, the valve 17a on the gas main from the gas producer to the engine is opened, the lever 53 is suddenly brought back to the point B passing over the points E, D and C in order, which causes closing of the gas outlet valve 22, then closing of the liquid fuel valve 44, and interruption of the current in the spark 33 and finally stoppage of the blower 37. From this time on, the gas producer operates through self-generated draft and the gases go to the engine for utilization. If it is, at any time necessary to force draft through the gas producer to activate the production of gas, the lever 53 can be brought back to the point C and left there, which causes operation of the blower and forced injection of air through 24.

If it is desired to shut off the engine 20, without shutting off the gas producer, this will be done by bringing the lever down to the point A, which causes the opening of the exhaust pipe 22 through cam 57, and by closing valve 17a the gas producer may be left in operation as a glowing rate for any desired length of time. When it is desired to bring the motor back to operation, the full blast will be regenerated in the gas producer by causing the lever 53 to go through the stages of operation controlled by the points C, D, E and F of the switch as heretofore described.

It is understood that when the gas producer is connected with an internal combustion engine, the spark current to the cylinder of the engine has to be on or off simultaneously with the operation of valve 17a, and the closing of valve 17a corresponds to the shutting off of the current at the engine spark while the opening of the valve 17a would correspond to the opening of the current to the spark. However, it is easily understood that the valve 17a may be entirely dispensed with; the closing or opening of the current to the spark of the engine being sufficient to render possible the operation of the engine through the gas produced in the gas producer, and the suction of the gas into the motor. Valve 17a has been provided as a safety device and is described for a better understanding of the invention.

The operation of the current at the spark motor may be separate from the operation of the switch for control of the gas producer or, if desired, it may be combined on the same switch.

I have described in connection with the operation of my method for the generation of gas, certain types of devices. It is understood that any other type of device may be used wherein the proper control of the various elements is maintained in relation with the phases described herein for the operation and in proper time in relation with each other.

I claim as my invention:

1. In combination, a gas producer, a gas generating section therein adapted to retain a solid carbonaceous fuel, gas outlets from said producer, a valve in one of said outlets, means comprising a blower for introducing a combustion supporting medium into said gas generating section, means in communication with a source of supply for introducing a combustible fuel into said producer, a valve in said latter means, means for igniting said combustible fuel, and manual control means adapted to initiate self operation of said producer comprising means movable to actuate concurrently and independently, the blower, said fuel igniting means and the valve in said gas outlet and said combustible fuel supply means.

2. In combination, a gas producer, a gas generating section in said producer adapted to retain a solid carbonaceous fuel, gas outlets from said producer, a valve in one of said outlets, means comprising a blower for introducing a combustion supporting medium into said gas generating section of said producer, means for supplying a combustible fuel under pressure to said producer at a point below and in communication with said gas generating section, a valve in said combustible fuel supply means, electrical igniting means for said combustible fuel, and means to initiate automatic operation of said producer comprising unitary control means manually movable to actuate concurrently and independently the blower, said igniting means and the valve in said gas outlet and said combustible fuel supply means.

3. In a gas producer for generating gaseous fuel from solid carbonaceous material, the combination of means including an air blower for introducing air to the producer, fluid fuel supply means discharging into the producer, a valve in the fuel supply means, an ignition device for igniting the fluid fuel issuing from the last-named means, and a manually operable control switch and means associated therewith for actuating said blower, valve and ignition device.

4. In a gas producer for generating gaseous fuel from solid carbonaceous material, the combination of means including an air blower for introducing air to the producer, fluid fuel supply means discharging into the producer, a valve in the fuel supply means, an ignition device for igniting the fluid fuel issuing from the last-named means, an outlet pipe for venting air from the producer, a valve in said pipe, and a manually operable control switch and means associated therewith for actuating said valves, the blower and the ignition device.

ARTHUR P. van HEEDEN.